United States Patent
Ohira

(10) Patent No.: US 7,942,959 B2
(45) Date of Patent: May 17, 2011

(54) INK FOR INK-JET RECORDING

(75) Inventor: Hideo Ohira, Tajimi (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 406 days.

(21) Appl. No.: 11/860,940

(22) Filed: Sep. 25, 2007

(65) Prior Publication Data
US 2008/0079794 A1    Apr. 3, 2008

(30) Foreign Application Priority Data

Sep. 29, 2006    (JP) .................................. 2006-270006

(51) Int. Cl.
*C09D 11/02* (2006.01)
(52) U.S. Cl. ................... 106/31.27; 106/31.65
(58) Field of Classification Search ............... 106/31.27, 106/31.65
See application file for complete search history.

(56) References Cited

U.S. PATENT DOCUMENTS

| | | | |
|---|---|---|---|
| 5,100,471 A * | 3/1992 | Winnik et al. ................ | 523/216 |
| 6,746,115 B2 | 6/2004 | Tomotake et al. | |
| 2003/0149131 A1* | 8/2003 | Ninomiya et al. ............ | 523/160 |
| 2007/0219291 A1* | 9/2007 | Doi et al. ...................... | 523/160 |

FOREIGN PATENT DOCUMENTS

| | | |
|---|---|---|
| JP | 4-185672 | 7/1992 |
| JP | 8-092513 | 4/1996 |
| JP | 2001-172535 | 6/2001 |
| JP | 2003-237062 | 8/2003 |
| JP | 2004-004987 | 8/2004 |

* cited by examiner

*Primary Examiner* — Jerry Lorengo
*Assistant Examiner* — Veronica Faison Gee
(74) *Attorney, Agent, or Firm* — Banner & Witcoff, Ltd.

(57) ABSTRACT

An ink for ink-jet recording, by use of which the ejection stability and the storage stability are improved while the occurrence of blurring is prevented, includes water, a water soluble organic solvent and a colored particle as a coloring agent. The volume average diameter of the colored particles is about 1 μm to about 5 μm, and the amount of particles having diameters equal to or greater than about 1.5 times the volume average diameter is about 5 vol % or less with respect to the total volume of the colored particles.

10 Claims, 1 Drawing Sheet

INK FOR INK-JET RECORDING

CROSS REFERENCE TO RELATED APPLICATION

The present invention claims a priority from Japanese Patent Application No. 2006-270006, which was filed on Sep. 29, 2006, the disclosure of which is herein incorporated by reference in its entirety.

BACKGROUND OF THE INVENTION

1. Field of the Invention

Embodiments of the present disclosure relate to an ink for ink-jet recording in which colored particles are employed as a coloring agent.

2. Description of the Related Art

As an ink for ink-jet recording, a dye ink in which a dye is dissolved in an ink solvent composed of water and a water soluble organic solvent are widely used. However, the dye ink easily cause blurring on printing materials. In view of this, so-called a particle ink have been proposed in which colored particles having a volume average diameter in the range of approximately 0.01 μm to 20 μm are employed as coloring agents.

It is desirable in such a particle ink that the specific gravity of the ink solvent be the same as that of the colored particles in order to prevent the colored particles from separating out from the ink solvent. Therefore, a density adjusting agent is used. The use of the density adjusting agent theoretically allows the densities of the ink solvent and the colored particles to be adjusted to the same level. However, a few percent difference in density between the ink solvent and the colored particles may occur due to measurement errors during preparation of the ink solvent, temperature variations, or the like.

The influence of the difference in density on the sedimentation velocity or floating velocity of the particles increases as the particle diameter increases. Because the particle diameter distribution of conventionally used colored particles is broad, large particles adversely affect the storage stability of the ink. In addition to this, large particles having diameters of approximately ⅕ to ⅓ or more of the diameter of the ink jet nozzles may also cause a problem in that the nozzles may become clogged temporarily. Furthermore, after the ink droplets land on the paper, relatively small particles of sub-micron sizes may penetrate the gaps between the paper fibers with the ink solvent. Therefore, a problem arises in that blurring can be observed with the naked eye and the edges of the image lines may be disturbed.

SUMMARY OF THE INVENTION

In view of the foregoing problems, it is aspects of the invention to improve the ejection stability and storage stability of an ink for ink-jet recording in which colored particles are employed as a coloring agent, and it is also aspects of the invention to prevent blurring of the ink on printing materials.

The present inventor has found that, when colored particles having a specific particle diameter distribution are employed, an ink for ink-jet recording may be obtained which does not cause blurring and has improved ejection and storage stabilities.

Accordingly, the aspects of the invention provides an ink for ink-jet recording comprising water, a water soluble organic solvent and a colored particle, wherein the volume average diameter of the colored particles is in the range of about 1 μm to about 5 μm, and wherein the amount of colored particles having diameters equal to or greater than about 1.5 times the volume average diameter is about 5 vol % or less with respect to the total volume of the colored particles.

In the ink of the aspects of the invention, the colored particles have a specific particle diameter distribution. Therefore, blurring is not observed in printed materials, and the edges of image lines in the printed materials are sharp. In addition to this, bleeding may be prevented in the printed materials.

The ink of the aspects of the present invention exhibits good ejection stability. Thus, "print dropouts" caused when ink droplets are not ejected may be prevented, and the occurrence of "misdirection" may also be prevented, where misdirection is a deflection of the ejection direction caused by a distorted meniscus on the ink-jet nozzles during ink ejection.

Furthermore, colored particles sedimenting or floating in the ink are not substantially present, and thus good storage stability may be obtained.

DETAILED DESCRIPTION OF THE PREFERRED EMBODIMENTS

Hereinafter, the aspects of the present invention will be described in detail.

An ink-jet recording ink contains colored particles as a coloring agent. The particles having a volumetric average diameter in the range of about 1 μm to about 5 μm are employed as the colored particles.

By employing the colored particles having a volume average diameter of about 1 μm or more, colored particles landed on a recording surface such as a paper surface are caught by paper fibers or a filler without penetrating into the recording surface with an ink solvent. Therefore, a printed material may be obtained in which blurring of an image does not occur, which has sharp edges and in which bleeding is also prevented. Furthermore, by adjusting the volume average diameter of the colored particles to about 5 μm or less, ejection stability from ink-jet nozzles may be ensured. In particular, it is preferable in terms of improving the ejection stability that the volume average diameter of the colored particles being 20% or less of the diameter of the ink-jet nozzles.

As the colored particles used are particles in which the diameters thereof are controlled such that the amount of particles having diameters equal to or greater than about 1.5 times the volume average diameter is about 5 vol % or less of the total volume of the colored particles. The amount of particles having diameters equal to or greater than about 1.5 times the volume average diameter is about 5 vol % or less, and about 4.5 vol % or less. By controlling the particle diameters in such a manner, high ejection stability may be maintained even when a difference in density occurs between the ink solvent and the colored particles due to slight temperature variations. By controlling the particle diameters in such a manner, the amount of large particles, which have a large separation velocity, is significantly reduced. Therefore, the storage stability of the ink as a whole is improved.

Figure 1A:
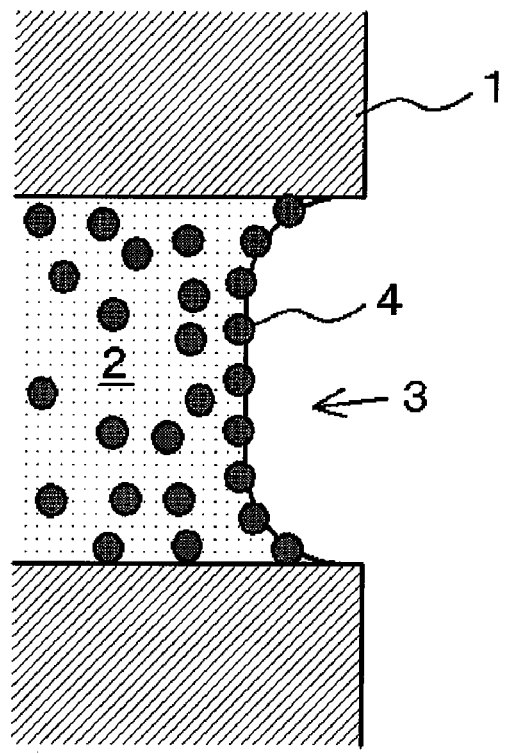
FIGS. 1A and 1B are explanatory diagrams of a meniscus in an ink-jet nozzle.
Figure 1B:
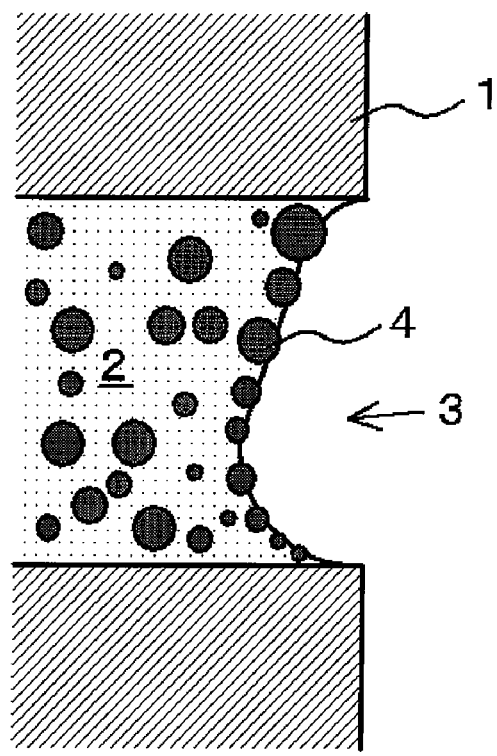

Theoretically, the sharper the particle diameter distribution of the colored particles, the more the ejection and storage stabilities are improved. Specifically, to stably eject ink droplets, a meniscus 3 of an ink 2 in a nozzle end of an ink-jet nozzle 1 may be axisymmetric in a cross-section containing a line extending in the depth direction from the center of the nozzle end, as shown in FIG. 1A. However, when dispersions in particle diameter distribution of the colored particles 4 are large, as shown in FIG. 1B, dispersions in the volume of the colored particles 4 present on the surface of a meniscus 3 just after ejection of an ink droplet are also large. As the result, the inertial force varies depending on the position of the surface of the meniscus 3, so that the meniscus 3 is not formed axisymmetrically. Such a meniscus is further distorted due to vibrations that occur during ejection. Hence, an ink droplet may be deflected and not landed perpendicular to a recording surface (misdirection) or may be separated into a plurality of ink droplets.

When the particle diameter distribution is excessively sharp, no problem arises in the performance of the ink, but the manufacturing cost increases significantly.

When the volume percentage of such particles relative to the total volume of the particles is sufficiently small, it is not necessary to pay attention to the ratio of the amount of colored particles having diameters of ½ or less of the volume average diameter to the total amount of the colored particles does not cause a problem. This is because the volume of such particles on the surface of the meniscus is small even if such particles are present on the surface of the meniscus, for example. However, the amount of colored particles having diameters of about 0.5 μm or less is about 5 vol % or less, and about 3 vol % or less with respect to the total volume of the colored particles. In this manner, blurring on printed materials may be prevented.

The density of the colored particles is in the range of about 1 g/cm$^3$ to about 1.2 g/cm$^3$, and in the range of about 1.05 g/cm$^3$ to about 1.15 g/cm$^3$. In this manner, the temperature dependence of the difference in density between the colored particles and the ink solvent may be reduced. In other words, to prevent the sedimenting or floating of the colored particles, it is desirable that the density of the colored particles being the same as that of the ink solvent. Thus, a density adjusting agent is used in accordance with need. However, the densities of the colored particles and the ink solvent vary independently from each other. Normally, the density of the ink solvent is approximately 1.1 g/cm$^3$. Therefore, the density of the colored particles is adjusted so as to be close to the density of the ink solvent, and as such, the amount of the density adjusting agent used may therefore be reduced. Furthermore, to prevent the difference in density due to temperature variations becoming large, it is preferable to adjust the density of the colored particles within the above-detailed range.

Colored particles having the above-mentioned particle diameter distribution and the above-mentioned density may be obtained by coloring resin particles having such a particle diameter distribution along with a coloring agent.

As the coloring agent, a dye rather than a pigment is preferred in terms of color-developing properties and color reproducibility.

The dye to be used may be selected from direct dyes, acid dyes, disperse dyes, cationic dyes, reactive dyes, sulfur dyes, oil-soluble dyes, metal complex dyes, and the like. In particular, disperse dyes and cationic dyes are preferred.

As a method for coloring resin particles with a dye, a coloring method may be employed in which, for example, resin particles are dispersed in a dye solution heated to about 40° C. to about 120° C., and the solution is stirred for a predetermined time. After the resin particles are colored with the dye, reduction cleaning is carried out in order to remove excess dye that may have precipitated onto the surface of the resin particles. A solvent used for the reduction cleaning is used an aqueous solution in which sodium hydroxide, sodium hydrosulfite or the like is dissolved.

The resin particles can be obtained by means of, for example, a dispersion polymerization method comprising adding monomers, a dispersant, an initiator and the like to a solvent, generating free radicals from the initiator under predetermined conditions, and radical-polymerizing the monomers in the solvent. The dispersion polymerization method may be carried out in a manner similar to a method for manufacturing resin particles that are used in a toner composition, the method being described in Japanese Patent Application Laid-Open No. 2004-4987 or the like. In the aspects of the invention, resin particles with a controlled particle diameter as described above are obtained by appropriately controlling the types, amounts and SP values (solubility parameters) of the components in the dispersion polymerization reaction and also controlling the reaction temperature, the reaction time and the like, and the obtained resin particles are then employed as required. More specifically, the amount of acrylic monomer with respect to the amount of styrene-based monomers is about 30 wt % or less, and about 20 wt % or less; the amount of the initiator with respect to the amount of the monomers is about 10 wt % or less, and about 6 wt % or less; the amount of the monomers with respect to the amount of the solvent is about 40 wt % or less, and about 30 wt % or less; the SP value of the solvent is in the range of about 12 (cal/cm$^3$)$^{1/2}$ to about 15 (cal/cm$^3$)$^{1/2}$, and in the range of about 13 (cal/cm$^3$)$^{1/2}$ to about 14.5 (cal/cm$^3$)$^{1/2}$; the reaction temperature is about 50° C. to about 63° C., and about 55° C. to about 60° C.

The amount of the colored particles in the ink is in the range of about 2 wt % to about 7 wt % with respect to the total amount of the ink.

The ink contains, in addition to the colored particles, water and a water soluble organic solvent. Furthermore, the ink may contain additives such as a density adjusting agent, a viscosity modifier, a dispersant, a surfactant, a pH modifier and a preservative in accordance with need.

Ion-exchanged water or pure water is as the water to be used. The amount of water in the ink is in the range of about 50 wt % to about 80 wt %.

The water soluble organic solvent contains a humectant which principally prevents drying of the ink at the end portion of ink-jet nozzles, and a penetrant which principally improves the drying velocity of the ink on paper.

Examples of the humectant include, without limitation, lower alcohols such as methyl alcohol, ethyl alcohol, n-propyl alcohol, isopropyl alcohol, n-butyl alcohol, sec-butyl alcohol, tert-butyl alcohol, and the like; polyalcohols such as 1,3-butanediol, 1,5-pentandiol, 1,6-hexanediol, glycerin, 1,2,6-hexanetriol, 1,2,4-butanetriol, 1,2,3-butanetriol, pentantriol, and the like; alkylene glycols such as ethylene glycol, diethylene glycol, triethylene glycol, propylene glycol, dipropylene glycol, tripropylene glycol, butylene glycol, thiodiglycol, hexylene glycol, and the like; polyalkylene glycols such as polyethylene glycol, polypropylene glycol, and the like; amides such as formamide, N-methylformamide, N,N-dimethylformamide, dimethylacetamide, and the like; amines such as monoethanolamine, diethanolamine, triethanolamine, monoethylamine, diethylamine, triethylamine, and the like; ketons and keto-alcohols such as acetone, diaceton alcohol, and the like; ethers such as tetrahydrofuran, dioxane, and the like; pyrrolidones such as 2-pyrrolidone, N-methyl-2-pyrrolidone, N-hydroxyethyl-2-pyrrolidone, and the like; nitrogen-containing heterocyclic compounds such as 1,3-dimethylimidazolidinone, ϵ-caprolactam, and the like; sulfur-containing compounds such as dimethyl sulfoxide, sulfolane, thiodiethanol, and the like. Of these, alkylene glycols and polyalcohols such as glycerin are preferred.

The humectant may be used alone or as a mixture of two or more. The amount of the humectant used in the ink is generally in the range of 0 wt % to about 95 wt %, in the range of about 10 wt % to about 80 wt %, and in the range of about 10 wt % to about 50 wt %.

Examples of the penetrant include, without limitation, ethylene glycol methyl ether, ethylene glycol ethyl ether, ethylene glycol propyl ether, ethylene glycol butyl ether, diethylene glycol methyl ether, diethylene glycol ethyl ether, diethylene glycol propyl ether, diethylene glycol butyl ether, diethylene glycol dimethyl ether, diethylene glycol diethyl ether, diethylene glycol dipropyl ether, diethylene glycol dibutyl ether, triethylene glycol methyl ether, triethylene glycol ethyl ether, triethylene glycol propyl ether, triethylene glycol butyl ether, triethylene glycol dimethyl ether, triethylene glycol diethyl ether, triethylene glycol dipropyl ether, triethylene glycol dibutyl ether, propylene glycol methyl ether, propylene glycol ethyl ether, propylene glycol propyl ether, propylene glycol butyl ether, dipropylene glycol methyl ether, dipropylene glycol ethyl ether, dipropylene glycol propyl ether, dipropylene glycol butyl ether, dipropylene glycol dimethyl ether, dipropylene glycol diethyl ether, dipropylene glycol dipropyl ether, dipropylene glycol dibutyl ether, tripropylene glycol methyl ether, tripropylene glycol ethyl ether, tripropylene glycol propyl ether, tripropylene glycol butyl ether, tripropylene glycol dimethyl ether, tripropylene glycol diethyl ether, tripropylene glycol dipropyl ether, tripropylene glycol dibutyl ether, and the like. In addition to this, alcohols such as ethanol, propanol, and the like may be employed.

The a penetrant may be used alone or as a mixture of two or more. The amount of the penetrant used in the ink is generally in the range of 0 wt % to about 20 wt %, in the range of about 0.1 wt % to about 15 wt %, and in the range of about 1 wt % to about 10 wt %.

Examples of the density adjusting agent include, without limitation, electrolytes such as sodium iodide, potassium iodide, sodium sulfate, sodium carbonate, potassium bromide, and the like. The above electrolytes are dissociated into a monovalent cation.

Examples of the viscosity modifier include, without limitation, starch, gum arabic, tragacanth, sodium alginate, casein, dextrin hydrate, methylcellulose, polyvinyl alcohol, polyacrylic acid, and the like.

Examples of the dispersant include, without limitation, polymers such as polyvinylpyrrolidone, polyacrylic acid, 1-hexadecanol, and the like.

Examples of the surfactant include, without limitation, anionic surfactants produced by Kao Corporation such as EMAL, LATEMUL, NEOPELEX, NS SOAP, KS SOAP, OS SOAP, PELEX and AMPHITOL; anionic surfactants produced by Lion Corporation such as LIPOLAN, K-LIPOLAN, LIPON, SUNNOL, LIPOTAC TE, ENAGICOL, LIPAL, LIONOL and LOTAT; nonionic surfactants produced by Kao Corporation such as EMULGEN, RHEODOL, RHEODOL SUPER, EMASOL, EMASOL SUPER, EXCEL, EMANON, AMIET and AMINON; nonionic surfactants produced by Lion Corporation such as DOBANOX, LEOCOL, LEOX, LAOL, LEOCON, LIONOL, CADENAX, LIONON, LEOFAT, ETHOFAT, ETHOMEEN, ETHODUOMEEN, ETHOMID and AROMOX; and the like. The surfactants may be used alone or as a mixture of two or more.

Examples of the pH modifier include, without limitation, amines such as monoethanolamine, triethanolamine, and the like; hydroxides such as potassium hydroxide, sodium hydroxide, lithium hydroxide, and the like.

To prevent the sedimenting or floating of the colored particles in the ink and to improve the storage stability of the ink, it is preferable to adjust the ink composition such that the sedimentation velocity computed from the following Stokes equation is about $3.9 \times 10^{-7}$ cm/sec (being 10 mm/month) or less:

$$V = \frac{2}{9} \cdot \frac{(\rho - \rho w)gr^2}{\eta}$$

wherein

V (cm/sec) is the sedimentation velocity of the colored particles, r (cm) is (the volume average diameter of the colored particles)/2, $\rho$ (g/cm$^3$) is the density of the colored particles, $\rho w$ (g/cm$^3$) is the density of the ink solvent, g (cm/sec$^2$) is the gravitational acceleration, and $\eta$ (g/(cm·sec)) is the viscosity of the ink solvent.

In terms of the ejection stability and the penetrability into paper, the viscosity $\eta$ of the ink solvent is adjusted to about 0.02 g/(cm·sec) to about 0.08 g/(cm·sec). The diameter of the colored particles is adjusted to fall within the range of about 1 μm to about 5 μm wherein the diameter is measured as the volume average diameter. To adjust the sedimentation velocity computed from the above equation to about 10 mm/month ($3.9 \times 10^{-7}$ cm/sec), it is preferable to adjust the composition of the ink solvent including the additives such that the difference between the density $\rho w$ of the ink solvent and the density $\rho$ of the colored particles is about 0.02 g/cm$^3$ or less, and about 0.005 g/cm$^3$ or less. Normally, the amount of the density adjusting agent such as sodium iodide, potassium iodide, sodium sulfate, sodium carbonate and potassium bromide is appropriately adjusted within the range of about 30 wt % or less.

The ink of the aspects of the invention may be manufactured by mixing all the above components, and then stirring according to a routine method.

EXAMPLES

Hereinafter, the aspects of the invention is specifically described by way of Examples.

Examples 1 to 4 and Comparative Examples 1 to 4

(1) Manufacturing of Polymerized Particles

Polymerized particles having each composition summarized in Table 1 were polymerized by means of a dispersion polymerization method as follows.

While nitrogen gas was introduced from a gas introduction tube into a reaction apparatus to which a stirrer, a cooling tube, a thermometer and the gas introduction tube were attached, all the components of the feed composition of each of the resin particles summarized in Table 1 were charged in the reaction apparatus. The reaction mixture was heated to 60° C., stirred at 100 rpm, and polymerized for a polymerization time summarized in Table 1. Furthermore, a diluent and a cross-linking agent solvent were added at a predetermined time after the initiation of the polymerization, as described in Table 1, and the polymerization was continued. Subsequently, the mixture was cooled to terminate the polymerization reaction. The mixture was filtrated, and polymerized particles were collected from the reaction apparatus. The collected polymerized particles were washed with a mixed solution of water and methanol, and were left to stand at room temperature for 48 hours, thereby obtaining dried polymerized particles.

(2) Manufacturing of Colored Resin Particles

The polymerized particles obtained in (1) were colored as follows.

A reaction apparatus to which a stirrer, a cooling tube and a thermometer were attached was charged with 100 parts by weight of ion-exchanged water, 100 parts by weight of the polymerized particles manufactured in (1) and 20 parts by weight of Kayalon Polyester Black S-200 (product of NIPPON KAYAKU Co., Ltd.) serving as a dye. The mixture was heated to 95° C. and stirred at 150 rpm for 1 hour. The mixture was filtrated to collect the obtained colored resin particles. To remove the excess dye remaining on the surface of the colored resin particles, reduction cleaning was performed using a mixture of 100 parts by weight of ion-exchanged water, 0.8 parts by weight of sodium hydrosulfate and 0.8 parts by weight of sodium hydroxide, and the resultant colored resin particles were lest to stand at room temperature for 48 hours, thereby obtaining dried colored resin particles (colored particles).

(3) Preparation of Inks

All the components in each ink composition summarized in Table 2 except for the colored resin particles (obtained in (2)) were thoroughly mixed. Subsequently, the colored resin particles were gradually added thereto while the mixture was subjected to ultrasonic waves, and the mixture was well stirred, thereby obtaining an ink.

(4) Evaluation (a) Volume Average Diameter and Particle Diameter Distribution of Colored Resin Particles The volume average diameter and particle diameter distribution of the obtained colored resin particles were measured by means of a particle diameter distribution measurement apparatus (Multisizer II, product of Beckman Coulter K. K) (the number of measured particles is 50000). In this instance, only particles having volume average diameters of 1 μm or less were subjected to measurement by means of the Microtrac UPA (product of NIKKISO CO., Ltd.). The ratio of the amount of particles having diameters equal to or greater than about 1.5 times the volume average diameter may be computed from a listing of volume percent of particle diameters, the listing being provided by the particle diameter distribution apparatus.

(b) Densities of Colored Resin Particles and Ink Solvent

The density of each of the colored resins was measured by means of a micro picnometer true density measurement apparatus (product of Yuasa Ionics Inc.).

Furthermore, the density of the ink solvent (the ink components except for the colored resin particles) was measured by means of a density-specific gravity meter (DA-100, product of KYOTO ELECTRONICS MANUFACTURING CO., LTD.).

(c) Viscosity of Ink Solvent

The viscosity of the ink solvent (the ink components except for the colored resin particles) was measured by means of a Brookfield viscometer (DVII+, product of Brookfield Engineering Laboratories, Inc.).

(d) Sedimentation Velocity of Colored Resin Particles

For the colored resin particles in each of the inks obtained in (3), the sedimentation velocity of colored resin particles having a diameter equal to the volume average diameter was computed by using the abovementioned Stokes equation.

(e) Storage Stability Evaluation 100 cc of each of the inks obtained in (3) was placed in a bottle having an inner diameter of 47 mm (the height of the ink was about 6 cm), and was left to stand at 30° C. for 1 month. Subsequently, a part of the ink in the upper portion in the bottle was sampled. Then, the absorbance ($\lambda$=500 nm) was measured by means of an ultraviolet-visible spectrophotometer (UV-2450, product of Shimadzu Corporation), and was evaluated using the following four criteria.

AA: The absorbance is 90% or more and 100% or less with respect to that before storage.

A: The absorbance is 80% or more and less than 90% with respect to that before storage.

B: The absorbance is 60% or more and less than 80% with respect to that before storage.

C: The absorbance is less than 60% with respect to that before storage.

(f) Printing Evaluation

Each of the inks obtained in (3) was filled in a cartridge (without foam) of a digital multifunction device equipped with an ink-jet printer (MFC-3100C, product of Brother Industries, Ltd.), and patterns for evaluating print quality were printed by means of the printer. The line edges and bleeding of the patterns (a black ink was printed on a yellow background) were evaluated based on the following criteria.

AA: No print dropouts and blurring are observed. The line edges are sharp, and little bleeding is observed.

A: Print dropouts and blurring are slightly observed. However, the line edges are shaper than those in patterns printed with pigment inks, and the degree of bleeding is better than that in general pigment inks.

B: The sharpness of the line edges and the degree of bleeding are similar to those obtained by using pigment inks.

C: The sharpness of the line edges and the degree of bleeding are worse than those obtained by using dye inks, or print dropouts in image lines are noticeable.

The above evaluation results are summarized in Table 2.

The inks of Examples 1 to 4 employed the colored resin particles of Nos. 1 to 4, respectively. In these cases, the volume average diameter of the colored particles is about 1 μm to about 5 μm, and the amount of particles having diameters equal to or greater than about 1.5 times the volume average diameter is about 5 vol % or less with respect to the total volume of the colored resin particles. As can be seen from Tables 1 and 2, in each of Examples 1 to 4, the results of the storage stability evaluation and the print evaluation were excellent. However, the ink of Comparative Example 1 employed the colored resin particles No. 5. In this case, although the amount of particles having diameters equal to or greater than about 1.5 times the volume average diameter is about 5 vol % or less with respect to the total volume of the colored resin particles, the volume average diameter of the colored resin particles is less than about 1 μm. Thus, in Comparative Example 1, the results of the print evaluation were poor. Furthermore, the inks of Comparative Examples 2 to 4 employed the colored resin particles of No. 6 to 8, respectively. In these cases, although the volume average diameter of the colored particles is about 1 μm to about 5 μm, the amount of particles having diameters equal to or greater than about 1.5 times the volume average diameter exceeds about 5 vol % with respect to the total volume of the colored resin particles. Thus, in Comparative Examples 2 to 4, the results of the storage stability evaluation were poor.

The invention is not limited to the embodiments described in the Examples, which are provided for illustrative purposes only. The material substances, their amounts used, and the conditions of producing them may be varied and modified without departing from the spirit and the scope of the invention as described herein.

What is claimed is:

1. An ink for ink-jet recording comprising: water, a water soluble organic solvent, and colored particles; wherein a volume average diameter of the colored particles is about 1 μm to about 5 μm, an amount of particles having diameters equal to or greater than about 1.5 times the volume average diameter is about 5 vol % or less with respect to the total volume of the colored particles, and

|  |  | Colored resin particles | | | | | | | |
|---|---|---|---|---|---|---|---|---|---|
|  |  | No. 1 | No. 2 | No. 3 | No. 4 | No. 5 | No. 6 | No. 7 | No. 8 |
| Feed composition of polymerized particles | Polyvinylpyrrolidone K-30*[1] (parts by weight) | 101 | 59 | 14 | 101 | — | — | 48 | 204 |
|  | Polyvinylpyrrolidone K-25*[2] (parts by weight) | — | — | — | — | 4 | — | — | — |
|  | Polyvinylpyrrolidone K-80*[3] (parts by weight) | — | — | — | — | — | 12 | — | — |
|  | Charge control agent*[4] (parts by weight) | — | — | — | — | 5 | — | — | — |
|  | 1-hexadecanol (parts by weight) | 25 | — | — | — | — | 6 | 6 | 51 |
|  | Methanol (parts by weight) | 1955 | 399 | — | 1956 | 466 | 466 | 466 | 4947 |
|  | Isopropyl alcohol (parts by weight) | 489 | 2322 | 553 | 489 | 116 | 116 | 116 | — |
|  | Distilled water (parts by weight) | — | 122 | 29 | — | — | — | — | — |
|  | Styrene (parts by weight) | 697 | 440 | 105 | 697 | 90 | 166 | 166 | 1309 |
|  | n-butyl acrylate (parts by weight) | 143 | 49 | 12 | 143 | 27 | 34 | 34 | 391 |
|  | Azobisisobutyronitrile (parts by weight) | — | 29 | 7 | 50 | 7 | 12 | 12 | 51 |
|  | Benzoyl peroxide (parts by weight) | 8 | — | — | — | — | — | — | — |
| Diluent*[5] | Water (parts by weight) | — | — | — | 504 | — | — | — | 1020 |
|  | Methanol (parts by weight) | — | — | — | 202 | — | — | — | 408 |
| Cross-linking agent solvent*[6] | Divinylbenzene (parts by weight) | — | — | — | 17 | — | — | — | 34 |
|  | Methanol (parts by weight) | — | — | — | 50 | — | — | — | 102 |
| Polymerization conditions | Polymerization temperature (° C.) | 60 | 60 | 60 | 60 | 60 | 60 | 60 | 60 |
|  | Polymerization time (hours) | 5 | 5 | 5 | 13 | 5 | 5 | 5 | 13 |
| Colored resin particles | Particle Volume average diameter (μm) | 1.22 | 2.63 | 2.63 | 4.53 | 0.49 | 3.22 | 2.71 | 4.25 |
|  | diameter distribution Ratio of amount of particles having diameters equal to or larger than 1.5 times volume average diameter (vol %) | 4.4 | 1.6 | 4.1 | 1.2 | 4.8 | 13.7 | 6.0 | 13.1 |
|  | Density (g/cm$^3$) | 1.11 | 1.11 | 1.11 | 1.11 | 1.11 | 1.11 | 1.11 | 1.11 |

*[1]Product of Nacalai Tesque, Inc.
*[2]Kollidon ® 25, product of BASF
*[3]Kollidon ® 80, product of BASF
*[4]Electrophotograph-use resin-based charge control agent, acrylic-based FCA, FCA-1001-NS, product of Fujikura Kasei Co., Ltd.
*[5]⅓ was added at 8 hours after initiation of polymerization, and ⅔ was added at 12 hours after.
*[6]added at 10 hours after initiation of polymerization.

TABLE 2

|  |  | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|---|
|  |  | No. | | | | | | | |
|  |  | No. 1 | No. 2 | No. 3 | No. 4 | No. 5 | No. 6 | No. 7 | No. 8 |
| Ink composition (wt %) | Colored resin particles | 4.0 | 4.0 | 4.0 | 4.0 | 4.0 | 4.0 | 4.0 | 4.0 |
|  | Pure water | 64.0 | 64.0 | 64.0 | 64.0 | 64.0 | 64.0 | 64.0 | 64.0 |
|  | Glycerin | 23.8 | 23.8 | 23.8 | 23.8 | 23.8 | 23.8 | 23.8 | 23.8 |
|  | Dipropylene glycol propyl ether | 2.0 | 2.0 | 2.0 | 2.0 | 2.0 | 2.0 | 2.0 | 2.0 |
|  | SUNNOL ® NL1430*[1] (surfactant) | 0.4 | 0.4 | 0.4 | 0.4 | 0.4 | 0.4 | 0.4 | 0.4 |
|  | Sodium iodide (specific gravity adjusting agent) | 5.8 | 5.8 | 5.8 | 5.8 | 5.8 | 5.8 | 5.8 | 5.8 |
| Evaluation | Ink solvent density (g/cm$^3$) | 1.10 | 1.10 | 1.10 | 1.10 | 1.10 | 1.10 | 1.10 | 1.10 |
|  | Ink solvent viscosity (g/cm · sec) | 0.023 | 0.023 | 0.023 | 0.023 | 0.023 | 0.023 | 0.023 | 0.023 |
|  | Sedimentation velocity of particles with the average diameter*[2] (mm/month) | 0.6 | 5.6 | 5.6 | 12.7 | 0.2 | 6.4 | 4.6 | 11.0 |
|  | Sedimentation velocity of particles having diameters equal to or more than 1.5 times volume average diameter*[2] (mm/month) | 1.4 | 11.7 | 11.7 | 28.5 | 0.4 | 14.4 | 10.5 | 24.8 |
|  | Storage stability*[3] | AA | A | A | A | AA | C | C | C |
|  | Printing | A | AA | AA | A | C | C | B | C |

*[1]Product of Lion Corporation
*[2]Computed from Stokes equation
*[3]Evaluation of ink sampled from upper portion in bottle a difference between a density of an ink organic solvent and a density of the colored particles is about 0.02 g/cm³ or less.

2. An ink for ink jet recording according to claim 1, wherein a sedimentation velocity of the colored particles when the ink is left at rest at 25° C. is about $3.9 \times 10^{-7}$ cm/sec or less, the sedimentation velocity being computed from the following Stokes equation:

$$V = \frac{2}{9} \cdot \frac{(\rho - \rho w)gr^2}{\eta}$$

wherein
V (cm/sec) is the sedimentation velocity of the colored particles,
r (cm) is (the volume average diameter of the colored particles)/2,
$\rho$ (g/cm³) is a density of the colored particles,
$\rho w$ (g/cm³) is a density of the ink solvent (the ink components except for the colored particles),
g (cm/sec²) is the gravitational acceleration, and
$\eta$ (g/(cm·sec)) is a viscosity of the ink solvent.

3. An ink for ink jet recording according to claim 1, wherein the density of the colored particles is about 1 g/cm³ to about 1.2 g/cm³.

4. An ink for ink-jet recording according to claim 1, wherein the amount of colored particles having diameters of about 0.5 μm or smaller is about 5 vol % or less with respect to the total volume of the colored particles.

5. An ink for ink-jet recording according to claim 1, wherein the ink further comprises a density adjusting agent.

6. An ink for ink jet recording according to claim 5, wherein the amount of the density adjusting agent is in the range of about 30 wt % or less.

7. An ink for ink jet recording according to claim 5, wherein the density adjusting agent is selected from the group consisting of sodium iodide, potassium iodide, sodium sulfate, sodium carbonate and potassium bromide.

8. An ink for ink jet recording according to claim 2, wherein the viscosity $\eta$ of the ink solvent is about 0.02 g/(cm·sec) to about 0.08 g/(cm·sec).

9. An ink for ink jet recording according to claim 5, wherein the density adjusting agent is selected from the group consisting of sodium iodide, potassium iodide, sodium carbonate, and potassium bromide.

10. An ink for ink jet recording according to claim 5, wherein the density adjusting agent is sodium iodide.

* * * * *

UNITED STATES PATENT AND TRADEMARK OFFICE
CERTIFICATE OF CORRECTION

| | | |
|---|---|---|
| PATENT NO. | : 7,942,959 B2 | Page 1 of 1 |
| APPLICATION NO. | : 11/860940 | |
| DATED | : May 17, 2011 | |
| INVENTOR(S) | : Hideo Ohira | |

It is certified that error appears in the above-identified patent and that said Letters Patent is hereby corrected as shown below:

Column 11, Claim 1, Line 1:
 Please delete "organic"

Column 12, Claim 6, Line 7:
 Please delete "ink jet" and insert -- ink-jet --

Column 12, Claim 7, Line 10:
 Please delete "ink jet" and insert -- ink-jet --

Column 12, Claim 8, Line 15:
 Please delete "ink jet" and insert -- ink-jet --

Column 12, Claim 9, Line 18:
 Please delete "ink jet" and insert -- ink-jet --

Column 12, Claim 10, Line 22:
 Please delete "ink jet" and insert -- ink-jet --

Signed and Sealed this
Twenty-eighth Day of February, 2012

David J. Kappos
*Director of the United States Patent and Trademark Office*